May 17, 1927.

E. M. BOLTON 1,628,641

FRYING PAN AND SAUCEPAN AND SUCH LIKE VESSEL

Filed July 14, 1925

INVENTOR:
Edith Mary Bolton
BY: Reege, Bayne & Bakelev
ATTORNEYS

Patented May 17, 1927.

1,628,641

UNITED STATES PATENT OFFICE.

EDITH MARY BOLTON, OF GERRARDS CROSS, ENGLAND.

FRYING PAN AND SAUCEPAN AND SUCH LIKE VESSEL.

Application filed July 14, 1925, Serial No. 43,454, and in Great Britain July 18, 1924.

This invention relates to improvements in frying pans and saucepans and has for its object the construction of such vessels for more convenient and economical use, especially in conditions where it is desired to cook small quantities of two or more different foods at the same time on one gas ring or stove.

In carrying my invention into effect I construct frying pans or saucepans having one or more straight upright sides, and I fit to these vessels handles for carrying and manipulating them, which are also formed to embrace one another.

For use in combination with such vessels I construct somewhat similar subsidiary vessels having in the same way straight upright sides, but in these latter cases I turn over the edge of the straight section so as to form a hook which is adapted to hook on the upper edge of the straight upright side of the first vessel in such a way that the two vessels when hooked together may be manipulated as one vessel and placed together on one gas ring or stove.

Sometimes I arrange around the edge of one or all of the vessels thus used in combination, a lip or channel of any convenient form and such that one of two vessels used in combination may be turned upside down and may rest securely as a cover on the other vessel.

I sometimes arrange the hook by which one vessel is attached to the other in such a manner as to give it a hinge action so that the one vessel may turn over on to the other without being unhooked.

My invention may be more particularly understood by reference to the accompanying sheet of drawings in which:—

Figure 1:
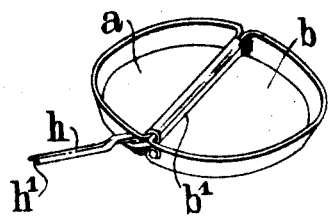
Fig. 1 is a view in perspective of my double frying pan when used as one vessel.
Figure 2:
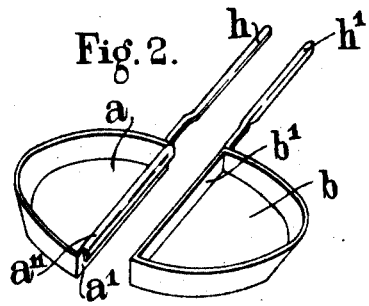
Fig. 2 is a view of the same when the two parts are separate one from the other.
Figure 3:
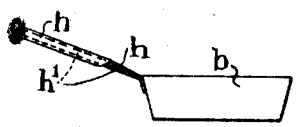
Fig. 3 is a side view, on a larger scale, of the improved double frying pan shown in Fig. 1.
Figure 4:
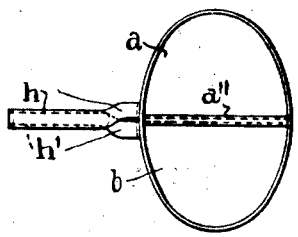
Fig. 4 is a plan view of Fig. 3.
Figure 6:
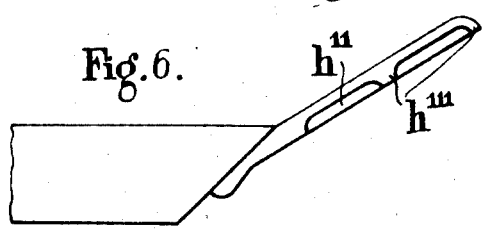
Fig. 6 shows a side view of such a pair of handles.
Figure 5:
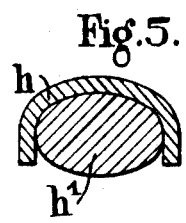
Fig. 5 is a sectional view of a pair of handles of a preferred form.

Referring now to Figs. 1 to 4, I construct a frying pan or saucepan as shown at $b$ and having one straight upright side $b'$ the rest of the periphery being of any convenient form. For use in conjunction with the vessel $b$ I construct a somewhat similar vessel $a$ having one straight upright side $a'$ and at the top edge of this side I form a hook $a''$ which is adapted to hook over the edge of the straight side $b'$ of the corresponding vessel. By this means I am able to construct a composite frying pan or saucepan such that the two parts may be manipulated as a unitary structure, and for this purpose I secure a handle on both of these vessels adjacent to the straight side thereof, the handles being designated $h$ and $h'$ respectively. Each handle is laterally offset from the point of connection with its vessel, as shown clearly in Fig. 4, and one of said handles as for instance the handle $h$ is of channel formation and adapted to embrace the other at its side edges and one face thereof, whereby when the vessels are placed with their straight sides in contiguous relation the handles nest one within the other thereby forming, as above stated, substantially a unitary structure. I do not always make the one handle to embrace the other along the whole length of its side but I sometimes form the said embracing handle with long gaps in its side as shown at $h''$ Fig. 6, and I may reduce the embracing portion to such an extent that it merely consists of two or more hooks or claws, embracing the corresponding handle at convenient points such as $h''$, my object in each case being so to make one handle embrace the other that they can only be separated by relative movement in the vertical plane.

I may apply my invention to a great variety of forms and shapes of frying pans and saucepans and I do not bind myself to any particular design illustrated herein.

What I claim is:—

A composite cooking utensil comprising in combination a pair of complementary vessels each having a straight side, the straight side of one being turned over at its top edge to form a hook for engaging the upper edge of the companion vessel, a handle secured to each of said vessels adjacent to the straight side thereof, each of said handles being laterally offset from the point of connection with its vessel and one of said handles being of channel formation and adapted to embrace the other at its side edges and one face thereof whereby when the vessels are hooked together the handles nest one within the other thereby to form substantially a unitary structure.

In testimony whereof I have signed my name to this specification.

EDITH MARY BOLTON.